United States Patent
Pitt

(10) Patent No.: US 12,523,162 B2
(45) Date of Patent: Jan. 13, 2026

(54) PROBE

(71) Applicant: ROLLS-ROYCE plc, London (GB)

(72) Inventor: Simon Pitt, Derby (GB)

(73) Assignee: ROLLS-ROYCE plc, London (GB)

( * ) Notice: Subject to any disclaimer, the term of this patent is extended or adjusted under 35 U.S.C. 154(b) by 26 days.

(21) Appl. No.: 18/386,049

(22) Filed: Nov. 1, 2023

(65) Prior Publication Data

US 2024/0167393 A1  May 23, 2024

(51) Int. Cl.
*F01D 21/00* (2006.01)
*G01B 13/18* (2006.01)

(52) U.S. Cl.
CPC ............ *F01D 21/003* (2013.01); *G01B 13/18* (2013.01); *F05D 2270/80* (2013.01)

(58) Field of Classification Search
CPC ........ F01D 21/003; F01D 17/02; F01D 17/08; G01K 13/02; G01K 13/024; G01K 1/08; G01K 1/12; G01K 1/14; G01K 1/16
See application file for complete search history.

(56) References Cited

U.S. PATENT DOCUMENTS

| | | |
|---|---|---|
| 4,433,584 A | 2/1984 | Kokoszka et al. |
| 4,559,836 A * | 12/1985 | Coleman ................. G01F 1/46 |
| | | 73/861.66 |
| 9,982,783 B2 * | 5/2018 | Penz ......................... F23R 3/60 |
| 10,598,041 B2 | 3/2020 | Rice et al. |
| 2005/0274178 A1 | 12/2005 | Shin |
| 2012/0096946 A1 | 4/2012 | Schleif et al. |
| 2021/0270144 A1 | 9/2021 | Holl et al. |
| 2023/0054983 A1 * | 2/2023 | Rémy ..................... F01D 17/02 |

FOREIGN PATENT DOCUMENTS

GB  2494138 A  3/2013

OTHER PUBLICATIONS

May 12, 2023 Search Report issued in British Patent Application No. 2217261.3.
Apr. 18, 2024 extended Search Report issued in European Patent Application No. 23206753.8.

* cited by examiner

*Primary Examiner* — Nathaniel E Wiehe
*Assistant Examiner* — Maxime M Adjagbe
(74) *Attorney, Agent, or Firm* — Oliff PLC

(57) ABSTRACT

A probe for determining the swirl angle of the exhaust gasses of a turbine engine, has an elongate body with a fastener, the elongate body having a tip at its proximal end and a head at its distal end, the elongate body having at least two passageways extending from the tip to the head, each passageway having an aperture at the tip and a port at the head which is connectable to a pressure sensor.

12 Claims, 2 Drawing Sheets

PROBE

This specification is based upon and claims the benefit of priority from UK Patent Application Number 2217261.3 filed on 18 Nov. 2022, the entire contents of which are incorporated herein by reference.

BACKGROUND

Summary of the Disclosure

The disclosure relates to a probe for monitoring the gas flow in an exhaust system. In particular, the disclosure relates to a probe for determining the swirl angle of the exhaust gas passing through the turbine in a gas turbine engine.

BACKGROUND OF THE DISCLOSURE

Tip clearance monitoring in gas turbines is an important part of assessing the performance of the engine. As such, control systems are used in gas turbines to determine the gap or clearance that exists between the rotor blades of the turbine and its surrounding casing. In a gas turbine engine, it is generally desirable that the zo gap between the rotor blade and the casing should be as small as possible, as this reduces the losses within the system and thus increases efficiency. At the same time, it is important to ensure that there is a gap, so that there is no rub between the rotor blades and the casing, which could result in damage to the blades and/or casing. The importance of having the correct gap is critical as the size of the components within the engine increases and decreases as a consequence of thermal expansion; this is the result of the temperature changes within an engine as it undergoes normal operation.

Tip clearance is a difficult parameter to measure and there are a number of complex systems that have been developed to monitor this issue. These measurement systems include capacitance and microwave monitoring. However, these measurement systems and techniques have a disadvantage in that they are fragile. This fragility is due to the nature of the electronics which means they tend to fail as a result of the harsh turbine temperatures and environment in which they operate. In addition to this they can only measure the relative position of the blade tip, and so are unable to provide information on segment wear and its clearance impact whilst the engine is running. Furthermore, they are sensitive to the axial movement of the blade as well as the radial movement whose components are very hard to separate. This means that accurately determining the blade tip clearance is difficult as any displacement from the sensor can give an erroneous reading. Consequently, there is a need to provide an improved method of measuring the tip clearance within a turbine engine.

Summary of the Disclosure

The scope of the disclosure is set out in the appended claims.

According to a first aspect of the disclosure there is provided a probe for determining the swirl angle of the exhaust gasses of a turbine engine, the probe consisting an elongate body with fastening means, the elongate body having a tip at its proximal end and a head at its distal end, the elongate body having at least two passageways extending from the tip to the head, each passageway having an aperture at the tip and a port at the head which is connectable to a pressure sensor.

The apertures may be disposed on the probe so that they are positioned less than 180° apart. The apertures may be symmetrically disposed relative to a plane passing through the centre of the probe. The plane being orthogonally offset relative to the axis of the elongate body which extends from the head to the tip. This allows the probe to determine a pressure difference between the apertures on either side of the plane.

The probe may feature a third passageway extending from the tip to the head and having an aperture at the tip facing away from the other apertures and a port at the head which is connectable to a further pressure sensor. This may be aligned along the plane.

The third passageway may be used to provide a total pressure reading. By positioning the aperture in the plane but facing in the opposite direction removes angular effects in the pressure determination.

The head may be also provided with positioning features.

The tip may be shaped to optimise its aerodynamic impact.

All three of the passageways may have equal cross sections.

The cross-sectional area of the passageway may change between the tip and the head of the probe.

The pressure sensors may be connected to a CPU, which is able to determine the swirl angle of the annulus gas.

The apertures may be symmetrically disposed about the probe.

According to a second aspect of the disclosure there is provided a gas turbine engine featuring the probe as discussed above, and wherein the probe is located downstream of one of the turbine sections and is located in a passageway extending between a combustor casing and an outer anulus, the probe being configured, so that only the tip protrudes through the combustor casing and into the exhaust path.

The probe is fastened to the combustor casing using a bolted flange.

A seal may be provided between the tip and the combustor casing.

The seal may be one of a piston ring seal, an O-ring seal, a braid seal, or a borescope seal.

According to a third aspect of the disclosure there is provided a method of determining the swirl angle of a gas turbine engine using the values obtained from the probe as discussed above, and wherein the swirl angle is calculated using:

$$C_{yaw,act} = \frac{\Delta P}{p_t - \left(\frac{p_{s,R} + p_{s,L}}{2}\right)} = \frac{p_{s,R} - p_{s,L}}{P_t - \left(\frac{P_{s,R} + P_{s,L}}{2}\right)}$$

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DESCRIPTION OF THE DRAWINGS

Embodiments of the invention will now be described by way of example with reference to the accompanying drawings in which.

DETAILED DESCRIPTION

Aspects and embodiments of the present disclosure will now be discussed with reference to the accompanying figures. Further aspects and embodiments will be apparent to those skilled in the art.

Figure 1:
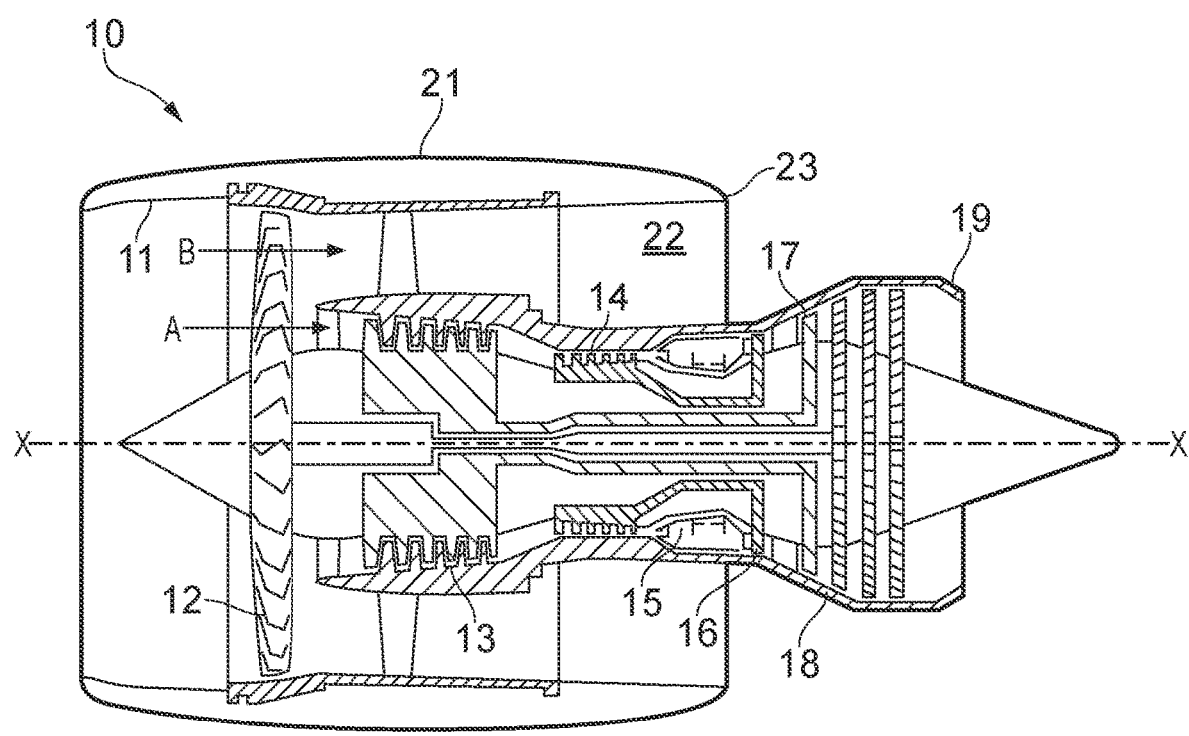
FIG. 1 shows a longitudinal cross-section through a ducted fan gas turbine engine.

With reference to FIG. 1, a ducted fan gas turbine engine incorporating the invention is generally indicated at 10 and has a principal and rotational axis X-X. The engine comprises, in axial flow series, an air intake 11, a variable pitch propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Monitoring the exhaust gas produced in a combustion engine can provide a user with a lot of information regarding the combustion process and about the engine. Furthermore, this information can also be used to determine aspects of the engine performance as well. The airflow can be measured for temperature and/or pressure, as well as composition. After the gas is expanded in the combustor it is forced through the turbines in order to drive these and as such powers the gas turbine engine. As the air interacts with the turbine rotors it causes the rotor blades to rotate about their axis which in turn drives a shaft that is used to drive the fan or an earlier compressor stage. At the outer annulus the swirl angle of the air exiting from a blade stage can be influenced by the leakage passing over the blade tip which is travelling at a different vector. It has been discovered that through measurement of the change in swirl angle it is possible to infer the running clearance between the upstream blade and the seal of the casing and how it changes over time.

Consequently, it is desirable to monitor the swirl angle within a gas turbine engine. In order to measure the swirl angle a probe can be used according to the present disclosure. This probe is placed in the gas stream and is used determine at least the swirl angle of the exhaust gas flow. The probe needs be placed close enough to the turbine stage so that it can sensitively detect the influence of the over tip leakage on swirl angle, and radial inboard annulus so not to be influenced by the boundary layer. The probe mat be positioned between 5-200 mm from the blade. More particularly, the probe may be positioned between 50 and 150 mm from the blade. The probe is to be mounted to the combustor casing, so that it can be securely held in position. The probe extends between the casing and the outer annulus. This can be through the use of a single fastening or multiple fastenings. Two or more fastenings are preferred as they are able to hold the probe at the correct angle relative to the air flow at all times and remove the ability of the probe to rotate. In addition to the fasteners, it is also possible to use positioning features, that are present on the probe or casing, and which interact with corresponding slots or holes on the casing or probe to further prevent movement or rotation of the probe. In particular, as this requires careful control of the angle of orientation of the probe relative to the air flow it is possible to achieve this by means of a low positional tolerance location pin. The fixing of the probe accurately and securely is important because any associated movement due to the large gas path pressure can affect the quality of the output data. The probe should protrude far enough into the air flow stream of the turbine, so that it can monitor the flow. However, the probe should not protrude too far into the airflow, so as to have detrimental effects. The probe may be any suitable size. It may have a diameter between 5 and 100 mm. The size needs to be appropriate such that the probe does not cause any unnecessary effects on the airflow.

Figure 2A:
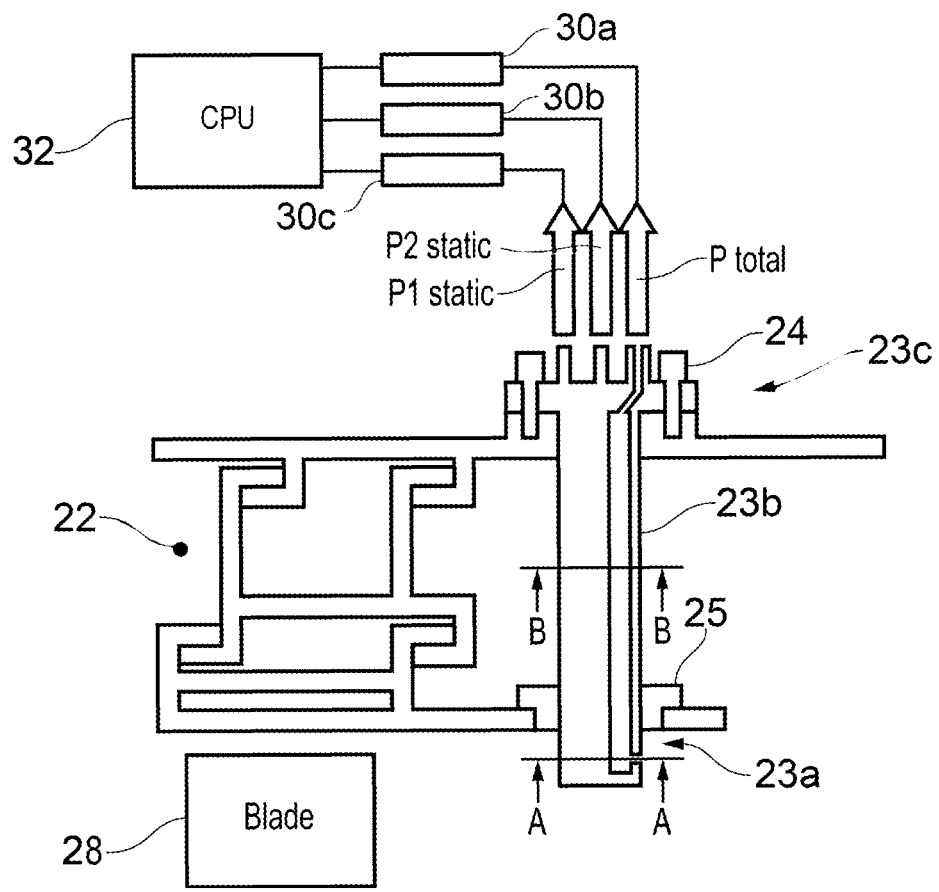
FIG. 2a shows an example probe according to the current disclosure and FIG. 2b presents a cross-sectional image of the probe according to the present disclosure.
Figure 2B:
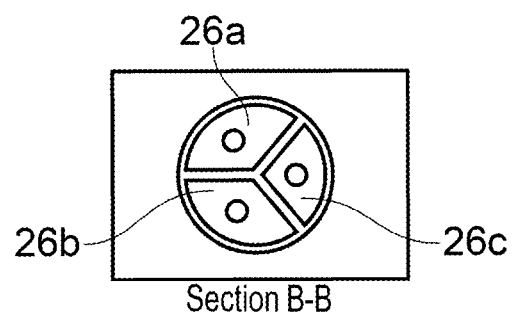
Figure 2B:
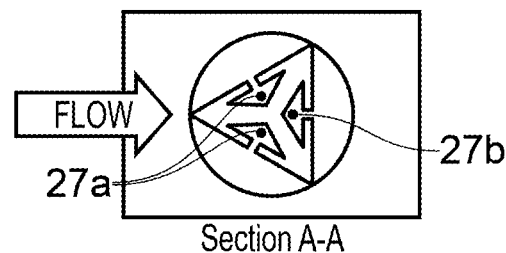

FIG. 2 presents an example of the fitting of a probe within the gas flow from the turbine according to the present disclosure. Turbine blade 28 extends across the combustor casing 22 of the gas turbine engine, which sits downstream of the combustor. The probe 23 extends through a section of the turbine casing wall of the gas turbine engine. The probe 23 has a tip portion 23a that extends into the turbine annulus gas flow. Portion 23b extends through the outer cavity and is exposed to the secondary air system sealing gas flow. The head portion 23c extends radially outboard of the Turbine casing. FIG. 2 shows the probe connected to the outer portion of the exhaust wall, which is to say away from the gas path. The probe is shown connected by two fasteners 24, which are used to hold the probe in position, however, more may be applied. The use of seal device 25 is important to minimise secondary air system gas flow losses into the Turbine annulus. The seal may be any suitable seal as would be appreciated by the person skilled in the art. Such seals may include piston ring, O-ring, braid seal, or borescope seal. Alternatively, it may also be a bolted flange, which is located outside of the gas path. As the probe extends through the exhaust wall a seal may be used around the probe head. Furthermore, the seal needs to be secure so that it is not ingested by the engine. The seal may be similar to those used on borescope ports.

FIG. 2b shows the cross section of the probe at cross-sections A-A and B-B. The probe at the cross-section A-A is shown as a triangular profile. However, other shapes may be used as will be apparent to the person skilled in the art. Internally the probe, as shown, is split into three channels 26a, 26b, 26c. The channels do not need to be equal size. The cross-sectional cut through has two forward facing holes—forward facing references towards the turbine engine in operation. The forward-facing holes 27a are used to measure the static pressure delta across the front of the probe. The two forward facing apertures may be angularly symmetric as this allows for the pressure difference between the two sides to be determined such that the change in swirl angle can be measured across the probe. The swirl angle can be inferred form the following formula:

$$C_{yaw,act} = \frac{\Delta P}{p_t - \left(\frac{p_{s.R} + p_{s.L}}{2}\right)} = \frac{p_{s.R} - p_{s.L}}{P_t - \left(\frac{p_{s.R} + P_{s.L}}{2}\right)}$$

Where $p_t$ is total pressure, $p_{s.R}$ is pressure on the right side of the probe and $p_{s.L}$ is pressure on the left side of the probe. The rear facing edge of the probe may have an aperture 27b. The aperture allows air to enter the rear of the probe, so that the probe is able to determine the total pressure reading for comparison. The air flow then travels from the cross-sectional area A-A to cross-sectional area B-B through the probe. The cross-section at this shows the three passages all being of equal size. Each of the passages extend to their own respective port 26 at the top of the probe. Each of these probes are coupled to a pressure sensor 30a, 30b, 30c for determining the pressure within the passage for that respective value. The readings are processed by a CPU 32 to determine the implied running clearance between the blades and the inner annulus seal.

Although the example shown in FIG. 2 is presented having three passages, the system can be designed with two or more passages. The only two passages that are required to detect the swirl angle are those having apertures facing the turbine blades. The apertures can be of any suitable size within the probe so as to allow a suitable amount of air to flow into the passage. The aperture should be the same size for both passages.

In order to be able to monitor the data from the pressure values, the system needs to be calibrated. Calibration can be performed at pass off where the clearance and the parameters of the engine are accurately known. Correlation of the probe measurement outputs to the control system needs to be achieved, this can be done through known rubbing moments during pass off and a predicted correlation at different engine operating points. It has been found that a probe in the gas path is sensitive to changes in running clearance between the upstream turbine blade and the seal segment interface. Subsequent thermal analysis has shown that the output from the probe has an excellent correlation with the predicted closures and running clearance. The probe can be made from any suitable material that is able to withstand the temperature in the exhaust path. The probe may be made out of any suitable material. For example, this may be a nickel based alloy. The external profile of the probe may be shaped to increase aerodynamic efficiency.

It will be understood that the invention is not limited to the embodiments above described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A probe for determining a swirl angle of exhaust gasses of a turbine engine, the probe comprising:
    an elongate body with fastening means, the elongate body having:
        a tip at a proximal end of the elongate body and
        a head at a distal end of the elongate body,
        at least three passageways extending from the tip to the head, each of a first and second of the passageways having an aperture at the tip and a port at the head which is connectable to a respective first pressure sensor and second pressure sensor, a third of the passageways extending from the tip to the head and having an aperture at the tip facing away from the aperture of the first passageway and an aperture of the second passageway, the third passageway facing a rearward direction and having a port at the head which is connectable to a third pressure sensor, wherein the rearward direction is a direction facing toward a rear of the turbine engine in operation.

2. The probe as claimed in claim 1, wherein the third passageway is used to provide a total pressure reading.

3. The probe as claimed in claim 1, wherein the head is also provided with positioning features.

4. The probe as claimed in claim 1, wherein the tip is shaped to optimise aerodynamic impact of the tip.

5. The probe as claimed in claim 1, wherein all of the at least three of the passageways have equal cross sections.

6. The probe as claimed in claim 1, wherein a cross-sectional area of each of the at least three passageways changes between the tip and the head of the probe.

7. The probe as claimed in claim 1, wherein the first pressure sensor, the second pressure sensor, and the third pressure sensor are connected to a CPU, which is able to determine the swirl angle of annulus gas.

8. A gas turbine engine featuring the probe according to claim 1, wherein the probe is located downstream of a turbine section and is located through a passageway extending between a combustor casing and an outer anulus, the probe being configured, so that only the tip protrudes through the combustor casing and into an exhaust path.

9. The gas turbine engine according to claim 8, wherein the probe is fastened to the combustor casing using a bolted flange.

10. The gas turbine engine according to claim 8, wherein a seal is provided between the tip and the combustor casing.

11. The gas turbine engine according to claim 8, wherein the seal is one of a piston ring seal, an O-ring seal, a braid seal, a bolted flange or a borescope seal.

12. A method of determining a swirl angle of a gas turbine engine using values obtained from the probe according to claim 1, and wherein the swirl angle is calculated using:

$$C_{yaw,act} = \frac{\Delta P}{p_t - \left(\frac{p_{s.R} + p_{s.L}}{2}\right)} = \frac{p_{s.R} - p_{s.L}}{P_t - \left(\frac{p_{s.R} + P_{s.L}}{2}\right)}$$

where $C_{yaw,act}$ act is the swirl angle, $p_t$ is total pressure, $p_{s.R}$ is pressure on a right side of the probe and $p_{s.L}$ is pressure on a left side of the probe, and $\Delta P$ is a difference in pressure between the right side of the probe and the left side of the probe.

* * * * *